United States Patent [19]
Sakon et al.

[11] Patent Number: 5,767,027
[45] Date of Patent: Jun. 16, 1998

[54] ALUMINUM NITRIDE SINTERED BODY AND ITS PRODUCTION METHOD

[75] Inventors: Atsushi Sakon, Nogoya; Ryusuke Ushikoshi, Tajimi; Koichi Umemoto, Toyota; Hiromichi Kobayashi, Yokkaichi, all of Japan

[73] Assignee: NGK Insulators, Ltd., Japan

[21] Appl. No.: 669,492

[22] PCT Filed: Feb. 3, 1995

[86] PCT No.: PCT/JP95/00141

§ 371 Date: Jul. 11, 1996

§ 102(e) Date: Jul. 11, 1996

[87] PCT Pub. No.: WO95/21139

PCT Pub. Date: Aug. 10, 1995

[30] Foreign Application Priority Data

Feb. 3, 1994 [JP] Japan .................................. 6-011804
Mar. 22, 1994 [JP] Japan .................................. 6-050481

[51] Int. Cl.⁶ .......................................... C04B 35/581
[52] U.S. Cl. ............................ 501/98.4; 501/98.5; 264/65
[58] Field of Search ...................... 501/96, 98, 98.4, 501/98.5; 264/65

[56] References Cited

U.S. PATENT DOCUMENTS

| | | | |
|---|---|---|---|
| 4,618,592 | 10/1986 | Kuramoto et al. | 501/96 |
| 4,803,183 | 2/1989 | Schwetz et al. | 501/96 |
| 5,036,026 | 7/1991 | Yamakawa et al. | 501/96 |
| 5,049,367 | 9/1991 | Nakano et al. | 501/96 |
| 5,293,509 | 3/1994 | Yamakawa et al. | 501/96 |

FOREIGN PATENT DOCUMENTS

| | | |
|---|---|---|
| 62-223070 | 10/1987 | Japan . |
| 63-85055 | 4/1988 | Japan . |
| 1-219068 | 9/1989 | Japan . |
| 5-64697 | 9/1993 | Japan . |

*Primary Examiner*—Michael Marcheschi
*Attorney, Agent, or Firm*—Wall Marjama & Bilinski

[57] ABSTRACT

An aluminum nitride sintered body is provided comprising metal elements contained in an amount of not more than 100 ppm for each metal element except for aluminum and assuming black color of a lightness of not more than N 4 according to the definition of JIS Z 8721. The aluminum nitride sintered body has preferably a relative density of at least 99.3% and crystal grains constituting the sintered body have an average particle diameter of at least 0.6 μm but not more than 4.0 μm. A powder of aluminum nitride obtained by reduction nitriding method is sintered at a temperature of at least 1.800° C. under a pressure of at least 120 kg/cm². Sintering temperature is preferably not more than 2.000° C. and the sintering is preferably effected for at least 2 hrs but not more than 5 hrs.

12 Claims, 1 Drawing Sheet

ALUMINUM NITRIDE SINTERED BODY AND ITS PRODUCTION METHOD

CROSS-REFERENCE TO RELATED APPLICATION

This application is a 371 of Intentional Application No. PCT/JP95/00141, filed Feb. 3, 1995.

TECHNICAL FIELD

The present invention relates to an aluminum nitride sintered body and its production method.

BACKGROUND OF INVENTION

Heretofore, in semiconductor apparatuses, such as, etching apparatuses, chemical vapor deposition apparatuses and the like, so-called stainless heaters and indirect heating system heaters have been generally used. However, when such heating systems are used, they are occasionally corroded by an action of a halogen series corrosive gas to form particles and they have bad heating efficiency.

In order to solve these problems, the inventors formerly proposed a ceramic heater comprising a dense ceramic substrate, and a high melting point metal wire embedded in the interior of the substrate. The wire was wound spirally in the interior of a disc shaped substrate and connected to electric terminals at both ends. Such a ceramic heater has been found to have superior properties, particularly in producing semiconductors.

As the ceramics for constituting the substrate of the ceramic heater, silicon nitride, aluminum nitride, SIALON and the like nitride series ceramics are considered preferable. In some cases, a susceptor is provided on the ceramic heater and a semiconductor wafer is mounted on the susceptor when heating the semiconductor wafer.

According to the inventors' study, aluminum nitride is preferably used as the substrate for such ceramic heaters and susceptors. This is because halogen series corrosive gases, such as, $CF_3$ are often used as etching gases or cleaning gases particularly in semiconductor production apparatuses and aluminum nitride is found to have an extremely high corrosion resistant property against these halogen series corrosive gases.

Meanwhile, the substrates used for such heaters and susceptors are requested to be black in color, because black substrates have a larger radiation heat and a superior heating property than white substrates.

However, aluminum nitride sintered bodies per se generally assume white or gray-white color, so that their heat radiation property is inferior. Therefore, in order to make aluminum nitride sintered bodies black, a suitable metal element is added to the raw material powder and the added raw material powder is fired to produce black aluminum nitride sintered bodies (refer to Japanese Patent Publication No.5-64,897). As such additives, tungsten, titanium oxide, nickel, palladium and the like are known.

However, when such a metal element is contained as a blackening agent in the aluminum nitride sintered body, the amount of impurities contained in the aluminum nitride sintered body is increased due to the influence of the additive. Particularly, if a Group I a element, a Group II a element or a transition metal element is present in the process of producing semiconductors, such an element can cause a serious adverse influence on the semiconductor wafers and the production plant, even if the amount of the element existing in the aluminum nitride sintered body is small. For example, it can be a cause of defects of the product semiconductors.

DESCRIPTION OF INVENTION

The present invention relates to an aluminum nitride sintered body, comprising metal elements of contents of not more than 100 ppm for each metal element except for aluminum and assuming black color of a lightness of not more than N 4 according to the definition of JIS Z 8721 (wherein JIS=Japanese Industrial Standard).

Also, the present invention relates to a method of producing an aluminum nitride sintered body, comprising sintering a powder of aluminum nitride obtained by reduction nitriding, at a temperature of at least 1,800° C. under a pressure of at least 120 kg/cm².

Also, the present invention relates to a method of producing an aluminum nitride sintered body, comprising sintering a powder of aluminum nitride containing metal elements contained in an amount of not more than 100 ppm for each metal element except for aluminum to obtain an aluminum nitride sintered body of a relative density of at least 99.3% and the crystal grains constituting the sintered body have an average particle diameter of at least 0.6 μm but not more than 4.0 μm.

In the process of studying aluminum nitride sintered bodies, the inventors have succeeded in providing an aluminum nitride sintered body wherein metal elements, such as a sintering additive, are substantially absent except for aluminum, and which assumes a black color of a lightness of not more than N 4 according to the definition of JIS Z 8721 showing black-gray color through black-brown color of an extremely low lightness.

Such an aluminum nitride sintered body assumes a black color of a lightness of not more than N 4 according to the definition of JIS Z 8721, hence it has a large radiation heat and superior heating property. Therefore, it is suited most to substrates for constituting heating members, such as, ceramic heaters, susceptors and the like. Moreover, because all the contents of the metal elements except for aluminum are not more than 100 ppm, there is no fear of contamination. Particularly, there is no fear that an adverse influence is incurred on the semiconductor wafers and the production apparatus itself.

Moreover, the inventors have found out that though a color unevenness is unavoidably generated on the surface of an aluminum nitride sintered body, such a color unevenness is substantially inconspicuous on the surface of the aluminum nitride sintered body of the present invention, so that the aluminum nitride sintered body of the present invention has an extremely good appearance.

More preferably, the aluminum nitride sintered body assumes black color of a lightness of not more than N 3 according to the definition of JIS Z 8721.

The expression "metal elements except for aluminum" used herein means those of Groups Ia–VIIa, VIII, Ib and IIb as well as a portion of IIIb and IVb (Si, Ga, Ge, etc ) of the periodic table.

Here, the word "lightness" will be explained. Surface color of a substance is expressed by chroma, lightness and hue which are three attributes; color, perception and sense of human. Among these attributes, lightness is a measure of the attribute of the sense of sight for judging whether a reflectance of a substance surface is large or small. The method of representing the measures of the three attributes is defined by JIS Z 8721. Lightness V is based on non-colors wherein the lightness of ideal black is taken as 0 and the lightness of ideal white is taken as 10 and the lightness between the ideal black and the ideal white is divided into 10 lightnesses of an equal spacing of the sense of sight for a lightness of a color so as to express the lightness of the color by a symbol between N 0–N 10. In the case of measuring a lightness of an actual sintered body, pieces of paper of standard colors of lightnesses of N 0–N 10 are compared with the surface color of the sintered body to determine the lightness of the sintered body. At that time, in principle, the lightness is determined to one decimal place with a value of 0 or 5 at the one decimal place.

More concretely, the inventors have succeeded in obtaining the above aluminum nitride sintered body by hot press sintering a powder of aluminum nitride obtained by reduction nitriding method at a temperature of at least 1,800° C.

Moreover, the inventors have deliberately studied conditions for the hot press sintering using a powder of a high purity aluminum nitride as a raw material to find out that the hot press sintering should be performed at a pressure of at least 120 kg/cm², in order to produce a novel aluminum nitride sintered body of a lightness of not more than N 4. That is, under such a condition the inventors have succeeded in producing a high purity aluminum nitride sintered body of a lightness of not more than N 4 and a relative density of at least 99.3%.

Here, a relative density of the aluminum nitride sintered body is a value defined by a formula [relative density=bulk density/theoretical density] with a unit [%].

As processes of producing a raw material powder of the aluminum nitride sintered body, there are known a reduction nitriding method and direct nitriding method. Chemical formula used in the respective method will be mentioned as follows.

Reduction nitriding method: $Al_2O_3+3C+N_2 \rightarrow 2AlN+3CO$

Direct nitriding method: $Al(C_2H_5)_3+NH_3 \rightarrow AlN+3C_2H_6$
(vapor phase process) $2Al+N_2 \rightarrow 2AlN$ Furthermore, the inventors have studied the texture of the aluminum nitride sintered body of a lightness of not more than N 4 to find out that the size of crystal grains constituting the aluminum nitride sintered body is important. Namely, the inventors have found out that the lightness of the aluminum nitride sintered body is increased if an average particle diameter of the crystal grains exceeds 4.0 µm. Particularly, in a dense aluminum nitride sintered body of a relative density of at least 99.3%, the lightness of the aluminum nitride sintered body exceeds 4 in case when the average particle diameter exceeded 4.0 µm.

Furthermore, viewed from this aspect, the aluminum nitride sintered body has more preferably an average particle diameter of the crystal grains of not more than 3.0 µm.

A powder of aluminum nitride obtained by reduction nitriding method should be sintered at a temperature of at least 1,800° C. Under the condition that each content of the metal elements except for aluminum is not more than 100 ppm in the sintered body as in the present invention, a sintering additive consisting of $Y_2O_3$ or the like metal oxide cannot be used in an effective amount, so that densification of the sintering body is hardly progressed. Thus, if the firing temperature is less than 1,800° C., a sintered body having the above described large relative density could hardly be produced even under a pressing condition like hot pressing.

The firing temperature should preferably be not more than 2,000° C. If the firing temperature exceeds 2,000° C., the sintering body is likely excessively sintered to decrease the relative density, and the crystal grains in the sintering body are progressively developed to increase the average particle diameter thereof.

Furthermore, a firing temperature of not more than 1,950° C. is preferable from the viewpoint of production, because a shaped body of the powder of aluminum nitride can easily be heated by an ability of a usual sintering apparatus. Meanwhile, when a firing temperature of at least 1,850° C. was used, an aluminum nitride sintered body of a relative density of at least 99.7% could be obtained to decrease the lightness of the aluminum nitride sintered body to not more than N 3, even under a pressing condition like hot pressing.

A holding time for sintering the powder of aluminum nitride obtained by the reduction nitriding method is preferably at least 2 hrs in order to enhance the blackness of the sintered body. However, in the range of the above described firing temperature and pressure, a sintering time exceeding 5 hrs has a tendency that the crystal grains are excessively developed within the sintered body, so that a holding time at the time of sintering is preferably not more than 5 hrs.

Furthermore, the inventors have found out that, even when a hot isostatic press method is applied on the powder of aluminum nitride prepared by the reduction nitriding method, a high purity aluminum nitride sintered body of a relative density of at least 99.3% and a lightness of not more than N 4 can be produced so far as the temperature and pressure conditions are the same with the above described temperature and pressure.

Moreover, the inventors have found out that, if the powder of aluminum nitride is sintered in a non-oxidizing atmosphere, an aluminum nitride sintered body of a high blackness can easily be produced. As the non-oxidizing atmosphere, atmospheres of nitrogen or the like inert gas is particularly preferable. Furthermore, preferably after the powder of aluminum nitride is preliminary shaped, the preliminary shaped body is hot press sintered or hot isostatic press sintered.

The pressure to be applied on the powder of aluminum nitride obtained by reduction nitriding at the time of sintering is preferably not more than 0.5 t/cm² from the view point of the ability of available apparatuses.

Moreover, even in the above described temperature and pressure conditions, an aluminum nitride sintered body of a relative density of 97% of a high lightness could merely be obtained when the powder of the high purity aluminum nitride was that prepared by direct nitriding. However, this is considered due to a fact that the raw material powder prepared by the direct nitriding method is difficult to sinter without a sintering additive.

In the above case, if the powder of aluminum nitride added with $Y_2O_3$ as a sintering additive was used, a sintered body of a lightness of at least 5.5 could merely be produced regardless of whether the raw material powder was prepared by reduction nitriding or direct nitriding, even when the sintered body had a relative density of at least 99.4%. Namely, it was necessary to use a powder of high purity aluminum nitride containing metal elements of not more than 100 ppm for each metal element except for aluminum.

The inventors have further made studies and as a result found out that an aluminum nitride sintered body of a lightness of not more than 4 can be produced, if the sintering is effected such that a sintered body of a relative density of at least 99.3% and an average particle diameter of not more than 4.0 µm is produced at the time of sintering a powder of high purity aluminum nitride containing metal elements of contents of not more than 100 ppm for each metal element except for aluminum. Moreover, an aluminum nitride sintered body of a lightness of not more than 3 can be produced, if the sintering is effected such that the sintered body has a relative density of at least 99.7%.

In that case, similar results were obtained even when a high purity aluminum nitride powder containing metal elements at contents of not more than 100 ppm for each metal element except for aluminum, prepared by direct nitriding, was used.

Preferably, the crystal grains constituting the aluminum nitride sintered body have an average particle diameter of at least 0.6 μm. If it is less than 0.6 μm, the sintering becomes insufficient.

Furthermore, preferably, the crystal grains constituting the aluminum nitride sintered body have an average particle diameter of 1.0–2.0 μm thereby to obtain the sintered body of a lightness of not more than 3.

The inventors have studied the reason why the sintered body abruptly assumes a black color by raising the relative density of the aluminum nitride sintered body to a very high value of at least 99.3%. And this is considered due to a fact that, if the sintered body has pores exceeding some limit, visible light beams are irregularly reflected from the interface between the pores and the crystal grains, so that the sintered body looks whitish. If the average particle diameter of the crystal grains constituting the sintered body is small, the number of crystal grain boundaries which allow permeation of visible light beams is increased. Though the pores are of course substantially not present due to the high relative density of the sintered body and the size of each crystal grain boundary is small due to the minor amounts of metal elements other than aluminum, it is considered that these crystal grain boundaries have defects (for example, oxygen defect, etc.) having energy levels of absorbing visible light beams, and the decreased average particle diameter of the crystal grains associated with the increased number of the crystal grain boundary decreases the lightness of the sintered body.

The aluminum nitride sintered body of the present invention has a large radiation heat amount and a superior heating property, so that it is suited most to substrates of heating members of ceramic heaters, susceptors and the like. Moreover, it has contents of metal elements of not more than 100 ppm for each element except for aluminum, so that there is little fear of contamination problems. Therefore, it is suited most as materials for high purity processes. Particularly, in semiconductor production processes, there is no fear of affecting a serious adverse influence on semiconductor wafers and the production apparatuses.

Preferably, heat conductivity of the aluminum nitride sintered body is at least 90 W/m·K for use as heating members of ceramic heaters, susceptors and the like.

Best Mode for Practicing the Invention

COMPARATIVE EXAMPLES 1–3 AND EXAMPLE 1

Figure 1:
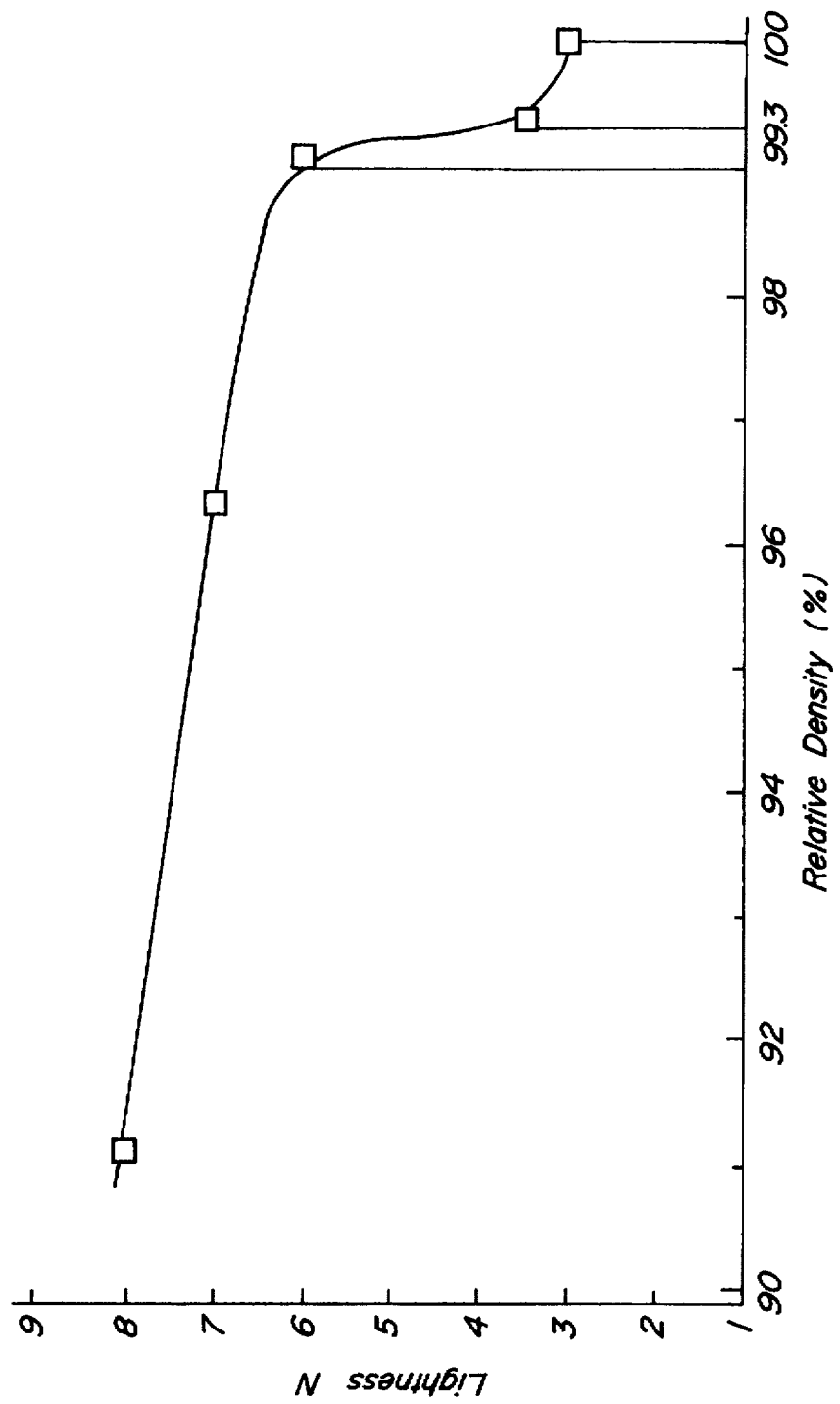
FIG. 1 is a characteristic graph of aluminum nitride sintered bodies showing a relation between the lightness N and the relative density.

The inventors actually produced aluminum nitride sintered bodies. As the raw material, a powder of aluminum nitride prepared by the above described direct nitriding method was used.

In Comparative Examples 1 and 2 shown in Table 1, the raw material powder contained 5 wt % of yttria, while in Comparative Example 3 and Example 1, the raw material was a high purity aluminum nitride powder not containing yttria.

In Comparative Examples 1 and 3 shown in Table 1, the raw material powders were shaped under monoaxial pressing to prepare preliminarily shaped bodies which were then hot press fired. When effecting the hot-pressing, a pressure of 200 kg/cm² was applied at 1,900° C. for 2 hrs. In Example 1, the above described preliminarily shaped body was hot press fired at 1,950° C. for 2 hrs under a pressure of 400 kg/cm². In Comparative Example 2, the preliminarily shaped body was cold isostatic pressed under a pressure of 7 t/cm² to obtain a shaped body, and the shaped body was accommodated in an enveloping chamber made of boron nitride and fired at 1,900° C. for 3 hrs under ambient pressure.

The thus obtained aluminum nitride sintered bodies of Comparative Examples 1–3 and Example 1 were measured on color tone, lightness, bulk density, relative density, average particle diameter, number of crystal grain boundary, heat conductivity, infrared radiation permeation ratio, contents of impurity elements and contents of main components.

Lightness was measured as described above. Bulk density was measured by Archimedes method. Theoretical density was determined depending on the raw material powder, namely, theoretical density is 3.36 g/cc in Comparative Examples 1 and 2 wherein the raw material powder contains an additive of 5% of $Y_2O_3$, and theoretical density is 3.26 g/cc in Comparative Example 3 and Example 1 wherein the raw material powder does not contain $Y_2O_3$.

Average particle diameter and number of crystal grain boundaries are measured by ASTM E 112-85. Namely, the sintered body of each example was worked to prepare a rectangular specimen of a length of 4 mm, a lateral length of 3 mm and a longitudinal length of 40 mm, which was then subjected to a four points bending strength test at 1,300° C. in a nitrogen atmosphere. The fractured surface of the crystal grain boundary of the tested specimen was observed by a survey type electron microscope, and a photograph of the fractured surface taken by the electron microscope was image analyzed to determine average particle diameter and number of crystal grain boundries. That is, a region of 30×30 μm was taken as an observation field and measurements were made on 10 observation fields to determine an average value of average particle diameter at each observation field. The number of crystal grain boundaries was expressed by measuring a number of crystal grain boundaries existing on a linear line of a length of 30 μm.

In measuring infrared radiation permeation ratio, a specimen having a thickness of 300 μm was prepared, a wavelength of the infrared radiation of 5–6 μm was used, and a IR-810 type infrared spectrophotometer was used, which is based on TFD electrical direct comparing method and uses a double beam filter and a grating spectroscope. The results of these measurements are shown in Table 1.

TABLE 1

|  | Comparative Example 1 Direct Nitriding Method | Comparative Example 2 Direct Nitriding Method | Comparative Example 3 Direct Nitriding Method | Example 1 Direct Nitriding Method |
| --- | --- | --- | --- | --- |
| Raw Material AlN |  |  |  |  |
| $Y_2O_3$ Addition Amount | 5 wt % | 5 wt % | None | None |
| Firing Method | Hot Press | Amb. Press | Hot Press | Hot Press |
| Firing Temp. (°C.) | 1,900 | 1,900 | 1,900 | 1,950 |

TABLE 1-continued

| Raw Material AlN | | Comparative Example 1 Direct Nitriding Method | Comparative Example 2 Direct Nitriding Method | Comparative Example 3 Direct Nitriding Method | Example 1 Direct Nitriding Method |
|---|---|---|---|---|---|
| Holding Time (hrs) | | 2 | 3 | 2 | 2 |
| Pressure (kg/cm$^2$) | | 200 | 0 | 200 | 400 |
| Color Tone | | Gray | Pale Brown | White | Black Gray |
| Lightness | | N6 | N7 | N9 | N3.5 |
| Bulk Density (g/cc) | | 3.34 | 3.30 | 3.15 | 3.24 |
| Relative Density (%) | | 99.4 | 98.2 | 97.0 | 99.4 |
| Average Particle Diameter (μm) | | 2.0 | 3.1 | 2.4 | 2.0 |
| Number of Grain Boundary | | 15 | 9 | 13 | 15 |
| Heat Conductivity (W/mk) | | 163.2 | 163.2 | — | — |
| Infrared Permeation (%) | | 14 | — | 6.5 | — |
| Impurity Content ppm | Si | 35 | 54 | 67 | 60 |
| | Fe | 6 | 6 | 4 | 4 |
| | Ca | 6 | 13 | 4 | 4 |
| | Mg | 5 | 4 | 4 | 4 |
| | K | <1 | <1 | 2 | 1 |
| | Na | <1 | <1 | 1 | 1 |
| | Cr | 2 | 2 | 1 | 1 |
| | Mn | 2 | 1 | 2 | 1 |
| | Ni | <1 | <1 | <1 | <1 |
| | Cu | <1 | <1 | <1 | <1 |
| | Zn | <1 | <1 | <1 | <1 |
| | W | <1 | <1 | <1 | <1 |
| | B | <1 | 24 | 5 | 4 |
| | Y | 3.75% | 3.89% | <1 | <1 |
| Main Component wt % | Al | 62.40 | 62.45 | 65.89 | 64.15 |
| | N | 31.46 | 31.75 | 33.18 | 32.86 |
| | O | 2.35 | 2.51 | 1.16 | 1.10 |
| | C | 0.04 | 0.01 | 0.03 | 0.03 |

As seen from Table 1, when the powder of aluminum nitride prepared by direct nitriding was used, the obtained sintered bodies assume gray, pale brown or white color tone and have high lightnesses, so that they are inferior in heat radiation property. Particularly, in Comparative Example 1 wherein the raw material powder containing 5 wt % of yttria was hot pressed at a temperature of 1,900° C. under a pressure of 200 kg/cm$^2$, an increased relative density of 99.4% was obtained even though the raw material powder was prepared by direct nitriding. This is due to a function of yttria of accelerating the sintering. However, the lightness was suppressed merely to N 6. This is considered due to the function of the sintering additive.

In Comparative Example 2, though the shaped body was prepared by cold isostatic press method, the sintered body had a relative density of 98.2% so that the lightness is still high.

In Comparative Example 3, though a powder of a high purity aluminum nitride prepared by direct nitriding was hot press sintered at a temperature of 1.900° C. under a pressure of 200 kg/cm$^2$, the sintered body had a relative density of only 97.0% and white color tone. Such a raw material powder needs a higher pressure.

In Example 1, though the raw material powder prepared by direct nitriding was used and a sintering additive was not used, the use of a high pressure of 400 kg/cm$^2$ at the time of hot pressing could succeed in improving the densification of the sintered body to a relative density of 99.4%. As a result, a sintered body of a lightness of N 3.5 and a black gray color tone could be obtained.

Comparative Examples 4–6

In the same manner as in Comparative Examples 1–3, aluminum nitride sintered bodies were produced using as the raw material a powder of aluminum nitride prepared by the above described reduction nitriding method.

In Comparative Examples 4 and 5 shown in Table 2, a raw material powder containing 3 wt % of yttria was used, and in Comparative Example 6, a raw material powder of a high purity aluminum nitride not containing yttria was used.

In Comparative Example 4, the raw material powder was shaped under monoaxial pressing to prepare a preliminarily shaped body which was then hot press fired. When effecting the hot pressing, a pressure of 200 kg/cm$^2$ was applied at 1,900° C. for 2 hrs. In Comparative Examples 5 and 6, the above described preliminarily shaped body was cold isostatic pressed under a pressure of 7 t/cm$^2$ to obtain a shaped body, and the shaped body was accommodated in an enveloping chamber made of boron nitride and fired at 1,900° C. for 3 hrs under an ambient pressure.

The thus obtained aluminum nitride sintered bodies of Comparative Examples 4–6 were measured on the same items as described above. The results of these measurements are shown in Table 2. In Comparative Examples 4 and 5 wherein the amount of addition of Y$_2$O$_3$ is 3 wt %, the theoretical density of the sintered bodies is 3.29 g/cc.

TABLE 2

| Raw Material AlN | | Comparative Example 4 Reduction Nitriding Method | Comparative Example 5 Reduction Nitriding Method | Comparative Example 6 Reduction Nitriding Method |
|---|---|---|---|---|
| Y$_2$O$_3$ Addition Amount | | 3 wt % | 3 wt % | None |
| Firing Method | | Hot Press | Ambient Press | Ambient Press |
| Firing Temp. (°C.) | | 1,900 | 1,900 | 1,900 |
| Holding Time (hrs) | | 2 | 3 | 3 |
| Pressure (kg/cm$^2$) | | 200 | 0 | 0 |
| Color Tone | | Gray | Pale Brown | White |
| Lightness | | N5.5 | N7 | N9 |
| Bulk Density (g/cc) | | 3.27 | 3.25 | 2.86 |
| Relative Density (%) | | 99.4 | 98.8 | 88.0 |
| Average Particle Diameter (μm) | | 1.2 | 2.0 | 0.7 |
| Number of Grain Boundary | | 18 | 15 | 27 |
| Heat Conductivity (W/mk) | | 150.0 | 188.0 | — |
| Impurity Content ppm | Si | 71 | 51 | 19 |
| | Fe | 12 | 12 | 6 |
| | Ca | 14 | 30 | 9 |
| | Mg | 7 | <1 | 2 |
| | K | 4 | <1 | 2 |
| | Na | 2 | <1 | 2 |
| | Cr | 2 | 2 | <1 |
| | Mn | <1 | <1 | <1 |
| | Ni | <1 | <1 | <1 |
| | Cu | 1 | 1 | <1 |
| | Zn | <1 | <1 | <1 |
| | W | <1 | <1 | <1 |
| | B | <1 | 37 | <1 |
| | Y | 2.06% | 2.11% | <1 |
| Main Component wt % | Al | 64.24 | 64.02 | 61.43 |
| | N | 32.14 | 32.76 | 29.50 |
| | O | 1.22 | 1.62 | 0.43 |
| | C | 0.04 | 0.02 | 0.06 |

As seen from Table 2, in Comparative Example 4, a raw material powder containing 3 wt % of yttria was used and hot press sintered at a condition of a pressure of 200 kg/cm$^2$ and a temperature of 1,900°C., and the obtained sintered body had a relative density of 99.4%. Therefore, in case of the powder of aluminum nitride containing yttria, the sintered bodies did not show a change in relative density regardless whether the powder was prepared by direct nitriding or reduction nitriding. However, lightness of the sintered body was 5.5 and color tone was gray, even in Comparative Example 4.

In Comparative Example 5, though a powder of material containing 3 wt % of yttria was fired at ambient pressure, the sintered body had a relative density of 98.8% and a high lightness.

In Comparative Example 6, though a powder of a high purity aluminum nitride containing a very small amount of impurities and not containing yttria or the like additive was used, white sintered bodies of low relative densities could only be produced.

Comparative Examples 7–9

Aluminum nitride sintered bodies were produced in the same manner as in Comparative Examples 1–3. As the raw material powder, a powder of a high purity aluminum nitride not containing yttria prepared by the above described reduction nitriding method, was used. The powder was monoaxially press formed to prepare preliminarily shaped bodies, which were then hot press fired in a nitrogen atmosphere.

In the case of the hot press firing, the firing was effected at a pressure of 50 kg/cm² and a temperature of 1,900° C. for 2 hrs in Comparative Example 7, a pressure of 100 kg/cm² and a temperature of 1,800° C. for 2 hrs in Comparative Example 8, and a pressure of 100 kg/cm² and a temperature of 1,900° C. for 2 hrs in Comparative Example 9.

The thus obtained sintered bodies of Comparative Examples 7–9 were measured in the same manner as described above. The results of the measurements were shown in Table 3.

TABLE 3

| Raw Material AlN | | Comparative Example 7 Reduction Nitriding Method | Comparative Example 8 Reduction Nitriding Method | Comparative Example 9 Reduction Nitriding Method |
|---|---|---|---|---|
| Y₂O₃ Addition Amount | | None | None | None |
| Firing Method | | Hot Press | Hot Press | Hot Press |
| Firing Temp. (°C.) | | 1,900 | 1,800 | 1,900 |
| Holding Time (hrs) | | 2 | 2 | 2 |
| Pressure (kg/cm²) | | 50 | 100 | 100 |
| Color Tone | | White | Pale Gray | Gray |
| Lightness | | N8 | N7 | N6 |
| Bulk Density (g/cc) | | 2.97 | 3.14 | 3.23 |
| Relative Density (%) | | 91.1 | 96.3 | 99.1 |
| Average Particle Diameter (μm) | | 1.2 | 2.5 | 3.0 |
| Number of Grain Boundary | | 18 | 12 | 10 |
| Impurity | Si | 13 | 12 | 13 |
| Content | Fe | 5 | 5 | 5 |
| ppm | Ca | 14 | 15 | 13 |
| | Mg | <1 | <1 | <1 |
| | K | 1 | 1 | 1 |
| | Na | <1 | <1 | <1 |
| | Cr | 1 | 1 | 1 |
| | Mn | <1 | <1 | <1 |
| | Ni | <1 | <1 | <1 |
| | Cu | <1 | <1 | <1 |
| | Zn | <1 | <1 | <1 |
| | W | <1 | <1 | <1 |
| | B | <1 | <1 | <1 |
| | Y | <1 | <1 | <1 |
| Main | Al | 65.82 | 65.35 | 65.45 |
| Component | N | 33.70 | 33.61 | 33.58 |
| wt % | O | 0.93 | 0.92 | 0.90 |
| | C | 0.05 | 0.04 | 0.04 |

In Comparative Example 7, presumably the sintering was not progressed sufficiently, because the pressure was a low value of 50 kg/cm², so that the sintered body had a relative density of 91.1% and white color tone.

In Comparative Example 8, though the pressure was 100 kg/cm² and the temperature was 1,800° C., the sintering was also not progressed sufficiently, so that the sintered body had a relative density of 96.3% and pale gray color tone.

In Comparative Example 9, the sintering was effected at a higher temperature of 1,900° C. under a pressure of 100 kg/cm², so that the sintered body had a relative density of 99.1% and pale gray color tone.

EXAMPLES 2–5

In the same manner as in Comparative Examples 7–9, aluminum nitride sintered bodies were produced. As the raw material, a powder of a high purity aluminum nitride prepared by the above described reduction nitriding method and not containing yttria, was used. The powder was then monoaxially press formed to prepare preliminarily shaped bodies which were then hot press fired in a nitrogen atmosphere. However, at the time of hot press firing, the firing temperature, the holding time and the pressure were changed as shown in Table 4.

The thus obtained aluminum nitride sintered bodies of Examples 2–5 were measured in the same manner as described above. The results of the measurements are shown in Table 4. A relation between the lightness N and the relative density of the sintered bodies measured on Comparative Examples 7–9 and Examples 2 and 3 are shown in FIG. 1.

TABLE 4

| Raw Material AlN | | Example 2 Reduction Nitriding Method | Example 3 Reduction Nitriding Method | Example 4 Reduction Nitriding Method | Example 5 Reduction Nitriding Method |
|---|---|---|---|---|---|
| Y₂O₃ Addition Amount | | None | None | None | None |
| Firing Method | | Hot Press | Hot Press | Hot Press | Hot Press |
| Firing Temp. (°C.) | | 1,800 | 1,900 | 1,900 | 1,950 |
| Holding Time (hrs) | | 2 | 2 | 2 | 2 |
| Pressure (kg/cm²) | | 200 | 200 | 120 | 150 |
| Color Tone | | Black Gray | Black Gray | Black Gray | Black Gray |
| Lightness | | N3.5 | N3 | N3.5 | N3.5 |
| Bulk Density (g/cc) | | 3.24 | 3.26 | 3.24 | 3.25 |
| Relative Density (%) | | 99.4 | 100 | 99.4 | 99.7 |
| Average Particle Diameter (μm) | | 0.6 | 1.1 | 2.7 | 3.0 |
| Number of Grain Boundary | | 28 | 19 | 11 | 10 |
| Heat Conductivity (W/mk) | | — | 92 | — | — |
| Infrared Permeation (%) | | — | 26 | — | — |
| Impurity | Si | 15 | 16 | 15 | 15 |
| Content | Fe | 4 | 4 | 4 | 4 |
| ppm | Ca | 9 | 10 | 10 | 9 |
| | Mg | <1 | <1 | <1 | <1 |
| | K | 1 | 1 | 1 | 1 |
| | Na | <1 | <1 | <1 | <1 |
| | Cr | 1 | 1 | 1 | 1 |
| | Mn | <1 | <1 | 1 | 1 |
| | Ni | <1 | <1 | <1 | 1 |
| | Cu | <1 | <1 | <1 | <1 |
| | Zn | <1 | <1 | <1 | <1 |
| | W | <1 | <1 | <1 | <1 |
| | B | <1 | <1 | <1 | <1 |
| | Y | <1 | <1 | <1 | <1 |
| Main | Al | 65.33 | 65.59 | 65.33 | 65.58 |
| Component | N | 33.60 | 33.64 | 33.57 | 33.58 |
| wt % | O | 0.88 | 0.85 | 0.89 | 0.90 |
| | C | 0.04 | 0.03 | 0.04 | 0.04 |

As seen from Table 4, in Example 2, the shaped body of the powder of the above described raw material aluminum nitride was hot pressed by firing at 1,800° C. under a pressure of 200 kg/cm² for 2 hrs to obtain a sintered body having black-gray color, a lightness of N 3.5, a relative density of 99.4% and an average particle diameter of 0.6 μm. It is considered that, at this condition, the sintering progressed sufficiently and the pressure was relatively large for the firing temperature of 1,800° C. so that the development of the crystal grains was suppressed.

In Example 3, the hot press firing was effected at 1,900° C. under a pressure of 200 kg/cm² for 2 hrs to obtain a sintered body of black-gray color of a lightness of N 3, a relative density of 100%, and an average particle diameter of 1.1 μm. The sintered body obtained at this condition shows a further progressing of the sintering and some further development of the crystal grains and a further low lightness as compared with Example 2.

In Example 4, the hot press firing was effected at 1,900° C. under a pressure of 120 kg/cm² for 2 hrs to obtain a sintered body of black gray color of a lightness of N 3.5, a relative density of 99.4%, and an average particle diameter of 2.7 μm. It is considered that, because the sintered body obtained at this condition shows a further development of the crystal grains, the lightness became a little larger as compared with Example 2.

In Example 5, the hot press firing was effected at 1,950° C. under a pressure of 150 kg/cm² for 2 hrs to obtain a sintered body of black-gray color of a lightness of N 3.5, a relative density of 99.7%, and an average particle diameter of 3.0 μm. It is considered that because the firing temperature was higher and the pressure was lower than Example 3, the development of the crystal grains could progress a little easier and the lightness became a little lower.

In Example 3, the obtained sintered body had a relative density of 100.0% and an infrared radiation permeation ratio of 26%.

EXAMPLE 6-7 AND COMPARATIVE EXAMPLES 10-11

In the same manner as in Comparative Examples 7-9, aluminum nitride sintered bodies of Examples 6-7 and Comparative Examples 10-11 were produced. As the raw material, the powder of a high purity aluminum nitride prepared by the above described reduction nitriding method not containing yttria was used, and the raw material powder was monoaxially pressed to form preliminarily shaped bodies, which were then hot press fired in a nitrogen atmosphere. However, at the time of hot press firing, the firing temperature, the holding time and the pressure were changed as shown in Table 5. In Comparative Example 11, the sintered body of the above described Example 3 was further heat treated at 1,950° C. for 2 hrs in a nitrogen atmosphere to obtain the sintered body of Comparative Example 11.

The thus obtained sintered bodies of Examples 6-7 and Comparative Examples 10-11 were measured in the same manner as described above. The results of these measurements are shown in Table 5.

TABLE 5

| Raw Material AlN | | Example 6 Reduction Nitriding Method | Example 7 Reduction Nitriding Method | Comparative Example 10 Reduction Nitriding Method | Comparative Example 11 Reduction Nitriding Method |
|---|---|---|---|---|---|
| Y₂O₃ Addition Amount | | None | None | None | None |
| Firing Method | | Hot Press | Hot Press | Hot Press | After hot press, heat treated at 1,950° C. for 2 hours in nitrogen atmosphere |
| Firing Temp. (°C.) | | 1,850 | 1,900 | 1,950 | |
| Holding Time (hrs) | | 2 | 5 | 7 | |
| Pressure (kg/cm²) | | 120 | 200 | 200 | |
| Color Tone | | Black Gray | Black Gray | Gray | Gray |
| Lightness | | N4 | N4 | N5 | N5 |
| Bulk Density (g/cc) | | 3.24 | 3.26 | 3.23 | 3.26 |
| Relative Density (%) | | 99.3 | 100 | 99.1 | 100 |
| Average Particle Diameter (μm) | | 3.1 | 3.8 | 3.2 | 4.2 |
| Number of Grain Boundary | | 10 | 6 | 9 | 5 |
| Heat Conductivity (W/mk) | | — | — | — | — |
| Infrared Permeation (%) | | — | — | — | — |
| Impurity Content ppm | Si | 15 | 15 | 15 | 15 |
| | Fe | 4 | 4 | 4 | 4 |
| | Ca | 9 | 9 | 9 | 9 |
| | Mg | <1 | <1 | <1 | <1 |
| | K | 1 | 1 | 1 | 1 |
| | Na | <1 | <1 | <1 | <1 |
| | Cr | 1 | 1 | 1 | 1 |
| | Mn | <1 | <1 | <1 | <1 |
| | Ni | <1 | <1 | <1 | <1 |
| | Cu | <1 | <1 | <1 | <1 |
| | Zn | <1 | <1 | <1 | <1 |
| | W | <1 | <1 | <1 | <1 |
| | B | <1 | <1 | <1 | <1 |
| | Y | <1 | <1 | <1 | <1 |
| Main Component wt % | Al | 65.40 | 65.29 | 65.30 | 65.57 |
| | N | 33.60 | 32.91 | 32.92 | 33.37 |
| | O | 0.88 | 0.92 | 0.92 | 0.99 |
| | C | 0.04 | 0.03 | 0.03 | 0.03 |

In Example 6, the firing was effected at a firing temperature of 1,850° C. under a pressure of 120kg/cm² for a holding time of 2 hrs to obtain a sintered body of a lightness of N 4 and a relative density of 99.3%. The sintered body had an average particle diameter of 3.1 μm measured by the above described method.

In Example 7, the firing was effected at a firing temperature of 1,900° C. under a pressure of 200 kg/cm² for a holding time of 5 hrs. The thus obtained sintered body had a bulk density of 3.26 g/cm² same as that of Example 3 but an increased lightness of N 4. The sintered body had an average particle diameter of 3.8 μm measured by the above described method, showing that the development of the crystal grains progressed as compared with Example 3. It is considered that the lightness of the sintered body was increased for the sake of the development of the crystal grains.

In Comparative Example 10, the firing was effected at a firing temperature of 1,950° C. under a pressure of 200 kg/cm² for a holding time of 7 hrs to obtain a sintered body of a lightness of N 5 of gray color and a relative density of 99.1% and an average particle diameter of 3.2 μm. The sintered body obtained by this condition showed an excessively progressed firing as compared with Example 3 and hence an increased lightness.

In Comparative Example 11, the sintered body of Example 3 was further heat treated at a firing temperature of 1,950° C. under an ambient pressure in a nitrogen atmosphere for a holding time of 2 hrs. As a result, the sintered body after the heat treatment had a bulk density of 3.26 g/cm³ showing an unchanged value as compared with the value of the sintered body before the heat treatment but had gray color tone and an increased lightness of N 5. As a result of measurement by the above described method, the sintered body obtained after the heat treatment had an average particle diameter of 4.2 μm. As seen from these results, in case of the heat treatment at ambient pressure, excessive sintering did not occur if the heat treatment was effected in a relatively short period of time, however, development of the crystal grains occurred, and hence the color tone of the sintered body turned gray.

Experiments of Heating Wafers

The aluminum nitride sintered body produced by Example 3 was worked into a plate of a diameter of 210 mm and a thickness of 10 mm. The plate was placed in a vacuum chamber equipped with a heating mechanism by means of an infrared radiation lamp. On the lamp was mounted a silicon wafer of a diameter of 8 inches and a thermocouple was attached thereto for simultaneously measuring the temperatures of the plate and the silicon wafer. As the infrared radiation lamp, 20 tubes of 500 W each having a peak of infrared radiation at around a wavelength of 1 μm were attached on an aluminum reflection plate, and the reflection plate and the lamps were arranged outside of the vacuum chamber. The infrared radiation beams emitted from the infrared radiation lamps were directly or after reflected from the reflection plate passed through a round quartz window of a diameter of 250 mm and a thickness of 5 mm arranged in the vacuum chamber, directed at the aluminum nitride plate to heat the plate.

In the heating mechanism, the infrared radiation lamps were heat generated to raise the temperature of the aluminum nitride plate from room temperature to 700° C. in 11 min and held at 700° C. for 1 hr, and thereafter the lamps were put off to gradually cool the plate. As a result, the infrared radiation lamps consumed an electric power of a maximum of 860 W to afford a stable controlling of the wafer temperature.

As a result of measurement, the silicon wafer had a temperature of 611° C. when the temperature of the plate was held at 700° C.

Similar experiments were performed on the aluminum nitride sintered bodies produced by Examples 4 and 5to obtain the same results as described above.

Similar experiments were carried out into effect on plates prepared from the aluminum nitride sintered body produced by Comparative Example 1, which is a white aluminum nitride sintered body obtained by firing at 1,900° C. and having a density of 99.4%. At that time, consumed electric power reached to a value of 10 KW at the maximum and the temperature increasing time was delayed by around 2 min. The heat cycle of temperature increase and decrease between room temperature and 700° C. was repeated to find out that the infrared radiation lamps were likely burned out.

As a result of measurement, the silicon wafer had a temperature of 593° C. when the temperature of the plate was held at 700° C., showing also a lower temperature as compared with the above described values of those of Examples 3–5.

As seen from the above results, the aluminum nitride according to the present invention is stable and has a better capability of absorbing an infrared radiation beam and a superior heat radiating ability than white aluminum nitride at the time of heating wafers.

Though in the foregoing explanations the present invention was explained with reference to specific preferable embodiments, it should of course be understood that various other manners and embodiments can be practiced without departing from the real spirit and scope of the present invention as defined in the appended claims.

Industrial Applicability

The aluminum nitride sintered body and its production method of the present invention can be satisfactorily applicable to heating elements, such as, ceramic heaters, susceptors and the like, particularly heating members for arranging in semiconductor producing apparatuses, such as, ceramic heaters, ceramic susceptors, ceramic electrostatic chucks, ceramic susceptors accommodating high frequency metal electrodes and the like.

We claim:

1. An aluminum nitride sintered body consisting essentially of (i) Al, N, O and C, and (ii) unavoidable impurity metal elements, each in an amount not exceeding 100 ppm, selected from the group consisting of Groups Ia–VIIa, VIII, Ib, IIb, Si, Ga and Ge, and having a black color of lightness measuring not more than N 4.

2. The aluminum nitride sintered body of claim 1, wherein the sintered body has a relative density of at least 99.3%.

3. The aluminum nitride sintered body of claim 1, wherein the sintered body has an average crystal grain size of about 0.6–4.0 μm.

4. The aluminum nitride sintered body of claim 3, wherein said average crystal grain size is not more than 3.0 μm.

5. The aluminum nitride sintered body of claim 3, wherein said average crystal grain size is about 1.0–2.0 μm.

6. A method of producing an aluminum nitride sintered body, comprising the steps of:
   providing an aluminum nitride powder formed by reduction nitriding; and
   sintering said powder at a temperature of at least 1800° C. under a pressure of at least 120 kg/cm² in a non-oxidizing atmosphere;
   whereby the aluminum nitride sintered body has a black color of lightness measuring not more than N 4 and consists essentially of (i) Al, N, O and C, and (ii) (unavoidable impurity metal elements, each in an amount not exceeding 100 ppm, selected from the group consisting of Groups Ia–VIIa, Ib, IIb, Si, Ga and Ge.

7. The method of claim 6, wherein the sintering step is carried out at a temperature not exceeding 2000° C.

8. The method of claim 6, wherein the sintering step is carried out under a pressure not exceeding 200 kg/cm².

9. The method of claim 6, wherein the sintering step is carried out for about 2–5 hours.

10. A method of producing an aluminum nitride sintered body, comprising:
    providing an aluminum nitride powder formed by direct nitriding; and
    sintering said powder at a temperature of at least 1800° C. under a pressure of at least 400 kg/cm² in a non-oxidizing atmosphere;
    where the aluminum nitride sintered body consists essentially of (i) Al, N, O and C, and (ii) unavoidable impurity metal elements, each in an amount not exceeding 100 ppm, selected from the group consisting of groups Ia-VIIa, VIII, Ib, IIb, Si, Ga and Ge.

11. The method of claim 10, wherein the aluminum nitride sintered body has a relative density of at least 99.3%.

12. The method of claim 10, wherein the aluminum nitride sintered body has an average crystal grain size of about 0.6–4.0 μm.

* * * * *